US005224562A

United States Patent [19]

Reed

[11] Patent Number: 5,224,562

[45] Date of Patent: Jul. 6, 1993

[54] MOTORIZED WALKING AID

[76] Inventor: Edward J. Reed, 5 Brynaeron Court, Dunvant, Swansea, United Kingdom

[21] Appl. No.: 768,648

[22] PCT Filed: Jan. 31, 1990

[86] PCT No.: PCT/GB90/00135

§ 371 Date: Sep. 30, 1991

§ 102(e) Date: Sep. 30, 1991

[87] PCT Pub. No.: WO90/08526

PCT Pub. Date: Aug. 9, 1990

[30] Foreign Application Priority Data

Jan. 31, 1989 [GB] United Kingdom ................ 8902029

[51] Int. Cl.[5] ........................................ B62D 51/04

[52] U.S. Cl. ........................... 180/6.5; 180/19.1; 180/65.8

[58] Field of Search ..................... 180/6.2, 6.5, 19.1, 180/65.8, 907; 280/87.021, 87.051, 304.1; 297/5, DIG. 10; 135/65, 67

[56] References Cited

U.S. PATENT DOCUMENTS

| | | | |
|---|---|---|---|
| 3,945,449 | 3/1976 | Ostrow | 180/6.5 |
| 4,280,578 | 7/1981 | Perkins | 180/6.5 |
| 4,463,817 | 8/1984 | Mennesson | 180/65.8 X |
| 4,657,100 | 4/1987 | Lewis | 180/19.1 |

*Primary Examiner*—Margaret A. Focarino
*Assistant Examiner*—Victor E. Johnson
*Attorney, Agent, or Firm*—Edwin D. Schindler

[57] ABSTRACT

A walking aid has a supporting framework (2, 3) mounted on two independently driven wheels, (5, 7) driven by respective electric motors (6, 8). The motors are operable by respective switches (10, 11) provided on the framework, such that each wheel can be independently rotatably driven in a clockwise or anticlockwise direction.

10 Claims, 2 Drawing Sheets

FIG. 1.
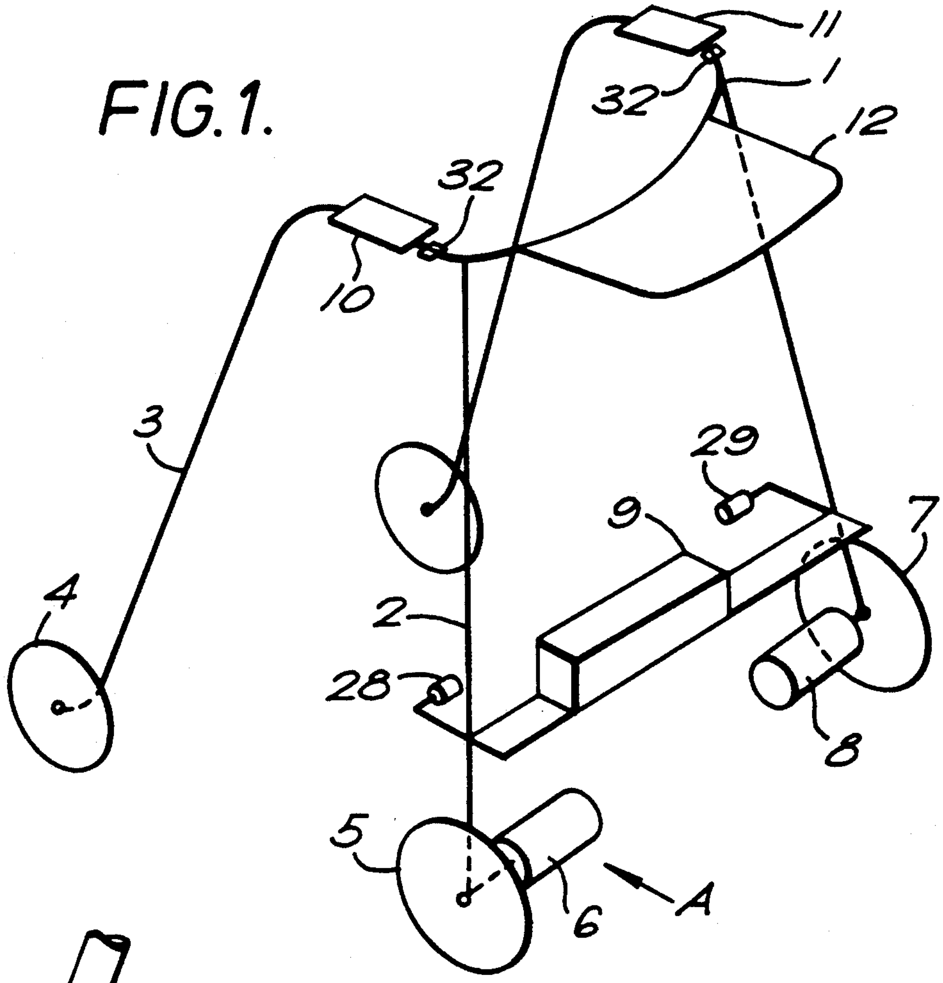
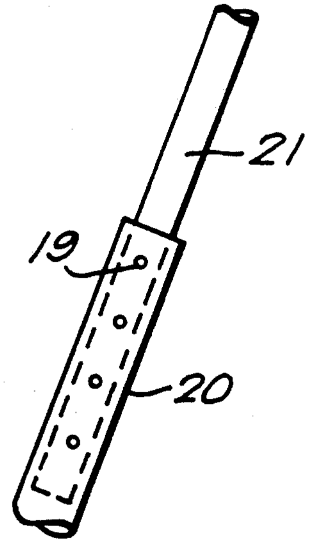
FIG. 2.
FIG. 3.
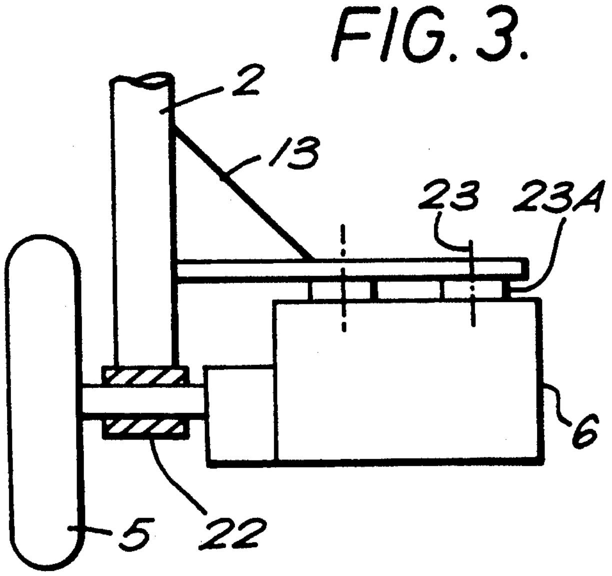

MOTORIZED WALKING AID

BACKGROUND OF THE INVENTION

The present invention is concerned with walking aids for the infirm or disabled.

The invention is based on the observation that there is a need for a walking aid to fill the gap between a walking frame, which has to be lifted and pushed by the user, and a wheelchair, which is of limited use indoors, is relatively costly, and carries the user but does not promote walking exercises.

SUMMARY OF THE INVENTION

According to the invention there is provided a walking aid comprising a framework for supporting a user, which framework is mounted on two rotatably driven support members, each support member being provided with a respective electric motor, each motor being provided with electrical power supply means and respective switches such that each respective support member is selectively independently rotatable in a clockwise or anti-clockwise direction.

Preferably, a timing device is provided arranged to limit the duration of power supplied to each respective motor.

It is preferred that further switching means be provided arranged to initiate the operation of the latter timing device. Advantageously, the further switching means is in the form of a photo-electric switching mechanism located on the frame, operable when a photo-electric circuit is broken, preferably by movement of a user's lower limbs.

The rotatable support members are preferably wheels (although equivalents to wheels, such as tracked members may alternatively be used); it is preferred that the frame should be further supported on one or more, preferably two, further undriven wheels.

Preferably the driven rotatable support members are positioned coaxially, advantageously at the front end of the frame, in which case the undriven wheel or wheels are preferably positioned at the rear of the frame.

A single power source, preferably in the form of one or more rechargeable batteries, may be used connected to each electric motor. Preferably, the respective switches are mounted one on each side of an upper part of the frame under the direct control of the user. Conveniently the switches are operated by sliding members in contact with the arms or hands of the user.

Advantageously each switch is of double pole reversing type with a neutral 'OFF' position so that a forward movement of the sliding member causes a respective motor to rotate in a forward driving direction and a backward movement in a backward driving direction, thus propelling the respective side of the frame forward or backward.

As each motor is independent of the other, the sliding members can be operated by the user to make the frame turn left or right, forward or backward. Each sliding member preferably contains means such as light springs to urge the switch to return to the neutral or 'OFF' position when the user relaxes directional pressure on the sliding member.

In a first embodiment of the present invention, the frame consists of an upper part having three sides, two of which are respectively at the left hand and right hand side of a user of the aid and generally disposed aligned with the direction of travel of the aid, and the third side disposed transversely to the direction of travel and at the front; and a lower part having two driven wheels as supports, one at the left hand side and the other at the right hand side and having two trailing undriven wheels at the rear, each driven wheel being powered by its own electric motor and where the frame carries at least one rechargeable battery electrically connected to each of the electric motors via appropriate control gear.

In this embodiment, the electric motors may be suitably geared or otherwise connected, one to each front wheel and mounted vertically, horizontally, in line or transversely to the direction of movement of the walking aid to suit the disposition and nature of the drive (which may be, for example belt, gearing, chain or a combination of these); they may further be self-braking on no current (i.e., the wheels resist rotation when no power is being supplied to them by the motor) and advantageously have variable speed control or several pre-determined speeds, the operating speed being chosen to suit a particular user.

To prevent accidental changes of direction of the walking aid, it is desirable to have an obstruction or restriction between the movements of the switches which cause respectively forward or reverse movement of the walking aid. One embodiment providing this desired effect, for example, where the switches are in the form of sliding members, is a gate requiring a short transverse movement of the respective sliding member at a neutral point before movement of the walking aid can be effected in forward or reverse direction.

As each motor, and thus its driven rotatable support member (hereinafter referred to as a wheel) is independent of the other, the respective switches can be operated by the user to make the walking aid turn left or right, forward or backward.

Preferably each of the first switches contains neutral biasing means; for example, where the switches are sliding members, springs may be used to urge the sliding members to return to a neutral or 'OFF' position when directional pressure is relaxed by the user.

It is desirable that the motors should not start with a jerk. This may be achieved by selecting motors and control gear with suitable characteristics; in one embodiment the switch may contain linear variable resistances or the equivalent in effect with neutral points, and similar biasing means so that the voltage to each motor may be varied or reversed, thus controlling the acceleration as well as the direction of the frame, the speed advantageously being proportional to the displacement from the neutral position of the individual sliding members.

Advantageously, the support framework is provided with height adjusting means; conveniently the frame may be telescopic in construction with locking means so that the height of the support frameworks may be adjusted to suit the user, i.e. relatively high if the user employs his forearms for support.

Advantageously the rear wheels of the walking aid according to the invention are castored to facilitate steering.

The frame may be adapted to carry a tray, basket, bell or other warning means, a light, bumpers, padding to prevent injury, and the like.

The bumper or bumpers may advantageously be connected to an overriding switch so that when an obstruction is struck, movement is interrupted or prevented.

In one embodiment, at least one of the first switches and a further switch (for lower limb proximity detection as previously described) must both be operated before forward movement of the walking aid results.

It is advantageous in certain cases to prevent movement of the walking aid unless the user is in a proper and safe position. To this end, the frame is preferably provided with a pressure switch and connected to the battery power circuit which is operable so that unless the support frame is subjected to downward pressure no current can flow to the motors irrespective of the position of any or all of the switches.

In another embodiment suitable for users with by certain types of disablement, first switches may be controlled by a single joystick type of controller operable by one hand, or by means of an extension piece for the head of the user.

Advantageously, the frame is foldable, or demountable for transportation or storage. In certain cases, additional support for the trunk of the user may be provided; for example, a seat may be attached to or pendant from the frame.

In a further embodiment, the driven wheels are situated one on each side of the rear of the frame with at least one undriven wheel at the front of the frame.

BRIEF DESCRIPTION OF THE DRAWINGS FIGURES

The invention will now be further described, by way of example only, in a particular embodiment, with references to the accompanying drawings, in which FIG. 1 is a diagrammatic general view of an exemplary embodiment of walking aid according to the invention.

FIG. 2 is a partially cut-away view of a frame member for such a walking aid;

FIG. 3 is the right hand wheel of the walking aid, viewed in the direction of arrow 'A' in FIG. 1;

DETAILED DESCRIPTION OF THE DRAWING FIGURE AND PREFERRED EMBODIMENTS

Figure 4:
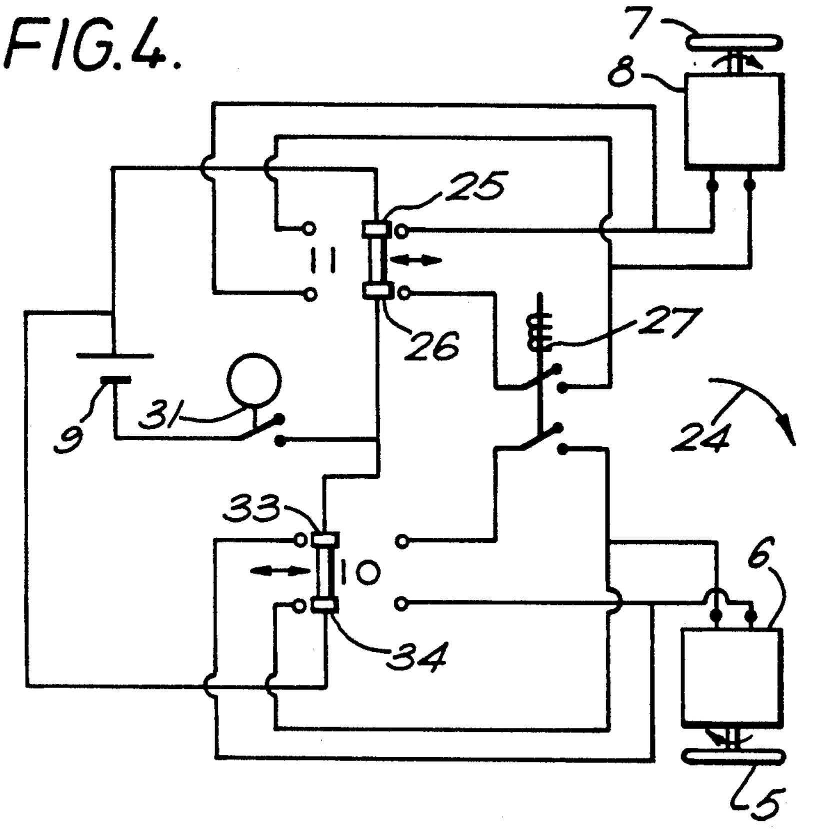
FIG. 4 shows a basic electrical circuit for use in connecting the power supply to the motors in FIG. 1.
Figure 6:
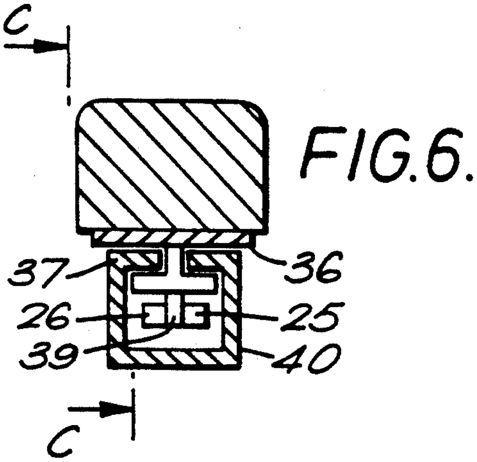
FIG. 6 is a cross-section along B—B in FIG. 5.
Figure 5:
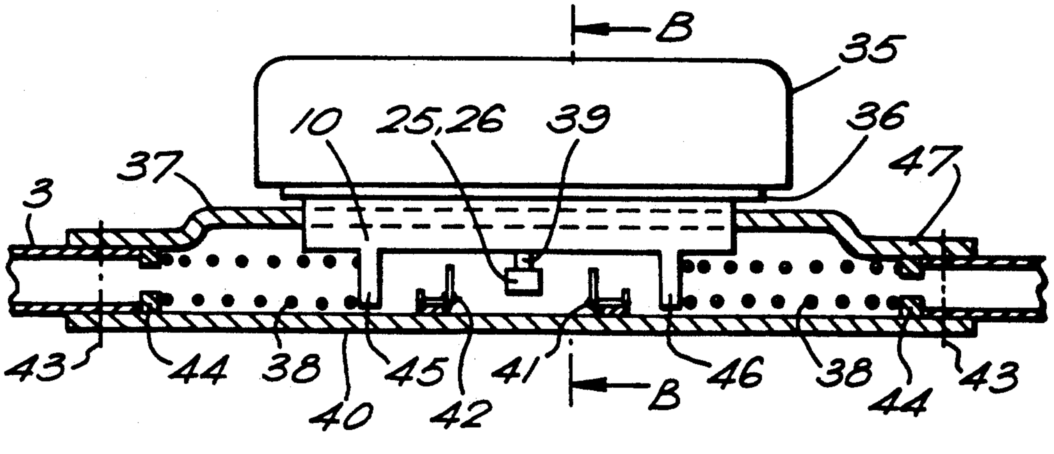
FIG. 5 is a longitudinal section through a slider type switch for use in the walking aid of FIG. 1.

Referring to the drawings, a frame 1 (preferably of tubular construction of a light metal) comprises a front strut or column 2, and a rear strut or column 3, to which are mounted a rear caster 4, a front right hand wheel 5, driven by a motor 6, a front left hand wheel 7 driven by motor 8, a power unit 9, a right hand sliding member 10 and a left hand sliding member 11.

The illustrated aid further includes an optional tray 12, and a photo-electric cell 28 and receptor system 29 or the like, as well as lockable hinges 32 to facilitate folding and transport.

FIG. 2 represents a typical front or rear strut with telescopic adjustment where the strut 21 is engaged by a hollow member 20 so that a pin 19 passing through opposite holes in 20 and a selected hole or hole pair in strut 21, so that the height above ground of the sliding members 10 and 11 may be adjusted with safety and locked in position. An internal ratchet and pawl system may also be used with the telescopic parts 20 and 21 to effect adjustment and locking.

FIG. 3 shows a bearing 22 fixed to the strut 2, and a bracket 23 to carry the geared motor 6, fixed by bolts 23A.

The bearing 22 may not be necessary if the bearing and shaft of the geared motor 6 are sufficiently robust.

In the basic electrical circuit of FIG. 4 25 and 26, 33 and 34 represent the sliding contacts of two multi-pole switches attached to sliders 10 and 11 respectively by means not shown. In the positions shown, motor 8 is driving forward and motor 6 is reverse, thus turning the frame in the direction of arrow 24, i.e. to the right.

27 represents a solenoid operated two switch system controlled by the photo-electric system or equivalent 28 and 29 in FIG. 1, the connections of which are not shown. Switch 27 locks out in the 'OFF' position until actuated by the above photo-electric system.

In operation, the user stands between the pairs of struts 2 and 3, facing the front of the frame 1.

The timer operated switch 31 is normally in closed position. It is set to a pre-determined time elapse, initiated by a flow of current when the solenoid switch 27 closes.

To move forward in a straight line, the user rests his or her hands or arms on the sliding members 10 and 11 and slides them both forward. The contacts 25 and 26, 33 and 34, are thus made to conduct electricity from the power unit 9 to the electric motors 8 and 6 so that both motors will drive forward when current flows.

The user then moves one of his or her legs forward in a natural walking movement, interrupting the light beam in the photo-electric system 28 and 29 which causes the solenoid switch 27 to close. Electricity thus flows to the motors 8 and 6. At the same time the timer controlled switch 31 is initiated so that after a pre-set time, switch 31 opens and movement ceases, generally allowing the frame to move forward a distance equivalent to a short pace to suit the user.

For certain types of disability the photo cell system 28 and 29 may be isolated or eliminated so that the user moves the switches 10 and or 11 from their neutral position the walking aid then moves a pre-determined amount and the user then takes a step to match the new position of the walking aid.

The frame is caused to move backwards by the user sliding the sliding members backwards and thus reversing the direction of the current to the motors 8 and 6. In this case movement of the frame does not interrupt a photo-electric beam.

Steering to left or right in forward or reverse movements of the frame is effected by moving sliding members 10 and 11 differentially, thus causing differential rotation of the motors 8 and 6. By this means the frame may be made to pivot about either front wheel or if one is made to rotate in a forward direction and the other in a reverse direction, the frame will pivot about a point central between them, thus providing effortless and accurate steering in any direction, while a significant part of the weight of the user is being taken by the sliding members 10 and 11 thus transmitted to the wheels in a frame promoting stability and thus confidence.

The slider 10 is mounted in frame 3 by suitable means such as by tubular extensions 47 engaging with frame 3 and firmly located by bolts 43.

The slider carries a resilient arm hand rest 35 and extensions 45 and 46, and extension 39. Extension 39 is an insulated support for moving contacts 25 and 26.

The moving contacts 25 and 26 make electrical contact with the fixed leaf spring contacts 41 and 42 which are connected by suitable wiring preferably through frame 3 and pairs of legs 2 to the power unit 9 and motors 8 and 6 (FIG. 1).

Springs 38 press against stops 44 and extensions 45 and 46 respectively, and urge the slider 10 towards a neutral position where the moving contacts 25 and 26 are not in contact with fixed contacts 41 and 42.

I claim:

1. A walking aid for aiding walking of a disabled user having use of their arms, comprising:

(a) a framework for supporting said user;

(b) two rotatably driven support members being mounted on said framework;

(c) a respective electric motor for each of said support members having a switch and electrical power supply means for supplying power thereto, each of said switches being operable by a respective sliding member slidably mounted on said framework and arranged for being contacted by said user, wherein movement of said respective sliding member in a first direction causes one of said respective electric motors to rotate in a clockwise driving direction and movement of said respective sliding member in an opposed direction causes said respective electric motor to rotate in a counter-clockwise driving direction so that each of said support members is selectively independently rotatable in clockwise and counter-clockwise driving directions; and, (d) means for limiting a duration of time of supplying power to each of said respective electric motors by said electrical power supply means.

2. The walking aid according to claim 1, wherein said means for limiting comprises a timing device.

3. The walking aid according to claim 2, further comprising additional switching means for initiating operation of said timing device, wherein said switching means is a photo-electric switching mechanism located on said framework, operable when a photo-electric circuit is broken by movement of said user.

4. The walking aid according to claim 1, wherein said support members are wheels positioned coaxially at a front end of said framework.

5. The walking aid according to claim 1, wherein each of said switches is a double-pole reversing type with a neutral position, each of said switches being operable by one of said respective sliding members arranged to be contacted by said user so that a forward movement of said respective sliding member causes one of said respective electric motors to rotate in a forward driving direction and a backward movement causes rotation in a backward driving direction, thus propelling a side of said framework in one of said driving directions.

6. The walking aid according to claim 5, wherein each of said respective sliding members contains biasing means for urging said switch to return to the neutral position when said user relaxes directional pressure on said sliding member.

7. The walking aid according to claim 1, wherein said electrical power supply means comprises a single power source connected to each of said respective electric motors, said single power source including at least one rechargeable battery.

8. The walking aid according to claim 1, wherein said framework is foldable for transportation and storage.

9. The walking aid according to claim 1, wherein said framework is further supported on at least one undriven wheel.

10. The walking aid according to claim 1, wherein said respective electric motors have variable speed control means, the speed being proportional to a displacement from a neutral position of said respective sliding members.

* * * * *